United States Patent Office 3,408,373
Patented Oct. 29, 1968

3,408,373
ALPHA-SULFO BRANCHED CHAIN FATTY ACIDS
AND METHOD FOR PREPARING THEM
Waldo C. Ault, Glenside, and Thomas J. Micich, Alexander J. Stirton, and Raymond G. Bistline, Jr., Philadelphia, Pa., assignors to the United States of America as represented by the Secretary of Agriculture
No Drawing. Filed Aug. 11, 1964, Ser. No. 388,963
19 Claims. (Cl. 260—400)

ABSTRACT OF THE DISCLOSURE

Branched chain fatty acids of the formula $$RCH(R')CO_2H$$

where the sum of the carbon atoms of R and R' is between 10 and 20 were prepared by the peroxide-initiated free radical addition of normal fatty acids in linear $\alpha$-olefins. Sulfonation with dioxane-$SO_3$ and neutralization, gave surface-active salts of $\alpha$-sulfo branched chain fatty acids with excellent wetting properties.

---

A non-exclusive, irrevocable, royalty-free license in the invention hereindescribed, throughout the world for all purposes of the United States Government, with the power to grant sublicenses for such purposes, is hereby granted to the Government of the United States of America.

This invention relates to compounds with surface active properties, and particularly relates to 2-sulfo-2-alkyl carboxylates and a method for their preparation.

An object of the present invention is to provide novel detergents and wetting agents. Another object is to prepare $\alpha$-sulfo derivatives of 2-alkyl carboxylic acids. A further object is to provide surface active agents of improved water solubility. Further objects and a fuller understanding of the invention may be had by referring to the following description and claims.

Although some 2-alkyl carboxylic acids have previously been prepared, the $\alpha$-sulfonated derivatives are not available because the usual methods of sulfonation have not been found applicable. We have discovered, however, that the sulfonate group may be introduced into 2-alkyl carboxylic acids by employing a system containing at least about 50% excess $SO_3$ in the presence of dioxane.

According to the present invention a 2-alkyl carboxylic acid of the formula $RCH(R')COOH$ wherein R is a straight chain alkyl radical having 7 to 16 carbon atoms, R' is a straight chain alkyl radical having 1 to 10 carbon atoms and the sum of the carbon atoms of $R+R'$ is an integer from 10 to 20, is prepared by the free radical addition of a straight chain monocarboxylic fatty acid having from 4 to 18 acrbon atoms and a terminal olefin of the formula $CH_3(CH_2)_nCH=CH_2$, wherein $n$ is an integer from 1 to 15, by heating the presence of an initiator such as t-butyl peroxide, the 2-alkyl carboxylic acid is separated from the reaction mixture and combined with at least about 50% molar excess each of $SO_3$ and dioxane in an inert solvent, such as carbon tetrachloride, and slowly heated to about 60° C. to produce an $\alpha$-sulfonated compound of the formula $RC(R')(SO_3H)COOH$ wherein R and R' are as previously described.

The thermal decomposition of alkyl peroxides such as t-butyl peroxide in the presence of a carboxylic acid removes an $\alpha$-hydrogen from the acid and produces a free carboxylic acid radical. The free radical will add to a terminal olefin forming a free dialkylacetic acid radical which can abstract an $\alpha$-hydrogen atom from a second molecule of carboxylic acid. This chain sequence leads to 60–70% yield of 2-alkyl carboxylic acids.

Many of the 2-alkyl carboxylic acids can be prepared in two specific ways, that is, employing two different combinations of starting materials.
To illustrate:

$CH_3(CH_2)CH_2COOH + CH_3(CH_2)_{13}CH=CH_2$
hexanoic acid      hexadecene

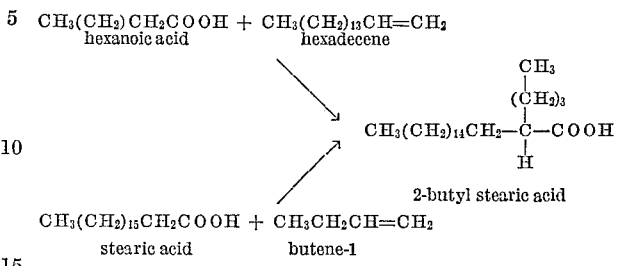

2-butyl stearic acid $CH_3(CH_2)_{15}CH_2COOH + CH_3CH_2CH=CH_2$
stearic acid      butene-1

In each addition reaction the product is 2-butyl stearic acid. Referring to the formula $RCH(R')COOH$, it is thus apparent that the alkyl radicals, R and R', may be derived from either reactant.

In a typical preparation of a 2-alkyl carboxylic acid, a carboxylic acid, an olefin and t-butyl peroxide are combined in a molar ratio of 10:1:0.25, respectively. Two-thirds of the acid to be used is placed in an appropriate size flask equipped with condenser, stirrer, dropping funnel and thermometer. The remaining one-third of acid is mixed with the olefin and peroxide. After heating the acid to reaction temperature (125° to 160° C.), the acid-olefin-peroxide mixture is added dropwise over a six-hour period with stirring. After complete addition, the mixture is maintained for an additional hour at reaction temperature. The 2-alkyl carboxylic acid product is isolated by vacuum distillation.

The olefins and aliphatic carboxylic acids were distilled prior to use, the center cut of the distillate being separated and its characteristics compared with literature values.

Example 1

Propionic acid, 740 g. (10 moles) octadecene-1-, 250 g. (1.0 mole) and 36.5 g. (0.25 mole) t-butyl peroxide were measured, and two-thirds of the acid was placed in a four-neck, round-bottom flask. The acid in the flask was heated to 140° C. and this temperature maintained while the remaining acid, the olefin and the peroxide were combined and added dropwise to the flask. As previously described, total time for reaction was seven hours. Simple distillation at reduced pressure provided a crude fraction of product which was purified by distillation through a 24-inch spinning band column. The product, 2-methyleicosenoic acid, collected at 172–4° C. at 0.20 mm. mercury pressure, was obtained in 57% yield and had a melting point of 60–61° C. Carbon-hydrogen and neutral equivalent analysis indicated a purity of over 98%.

Example 2

The procedure of Example 1 was repeated except that the olefin used was hexadecene-1 (222 g.), and the product was 2-methyloctadecanoic acid.

Example 3

In a manner similar to that of Example 1, two-thirds of 500 g. of hexanoic acid was placed in the flash and heated to about 160° C. The remainder of the hexanoic acid, 72.6 g. of dodecene-1, and 15.8 g. of t-butyl peroxide were combined and added dropwise. Following the reaction, 2-butyltetradecanoic acid was recovered by distillation in 63% yield.

Examples 4–6

Procedures employed were substantially that of Example 1. The reactants employed and some physical and chemical properties of the products of these examples and data pertaining to Examples 1–3 are summarized in Table I.

Sulfonation reactions conducted with too great an excess of sulfur trioxide, or under too high a temperature, result in charring and side-product formation and the impurities interfere with separation of the product desired the preparation of the 2-sulfonated derivatives were purified prior to combining for the reaction. Reagent grade carbon tetrachloride was passed through a 12-inch column of silica gel and stored over anhydrous sodium sulfate until used. Dioxane was distilled through a 24-inch vacuum jacketed column filled with protruded packing.

TABLE I.—DATA REGARDING PREPARATION AND PROPERTIES OF SOME 2-ALKYL CARBOXYLIC ACIDS

| Example Number | Reactants | | Reaction [a] Temp., °C. | Acid Product | Yield, percent | M.P., °C. | B.P., [b] °C./mm. | Neut. Equival. | |
|---|---|---|---|---|---|---|---|---|---|
| | Olefin | Acid | | | | | | Found | Theory |
| 1 | Octadecene-1 | Propionic | 140 | 2-methyleicosanoic | 57 | 60–1 | 172–4/0.20 | 331 | 326 |
| 2 | Hexadecene-1 | do | 138 | 2-methyloctadecanoic | 56 | 54–5 | 164–8/0.20 | 305 | 298 |
| 3 | Dodecene-1 | Hexanoic | 160 | 2-butyltetradecanoic | 63 | 26 | 152–3/0.30 | 282 | 284 |
| 4 | Nonene-1 | Nonanoic | 160 | 2-heptylundecanoic | 60 | 18–9 | 151/0.30 | 283 | 284 |
| 5 | Octene-1 | Decanoic | 160 | 2-octyldecanoic | 68 | 33–4 | 162–3/0.05 | 287 | 284 |
| 6 | Tetradecene-1 | Isobutyric | 145 | 2,2-dimethylhexadecanoic | 36 | 465–75 | 114–6/0.20 | 287 | 284 |

[a] Reaction temperatures are indicated as the median of a 3–6° range.   [b] All melting points and boiling points are uncorrected The use of a sulfur trioxide-dioxane adduct in carbon tetrachloride makes it possible to conduct the sulfonation with only about a 50% molar excess of $SO_3$. The use of a higher ratio of $SO_3$-dioxane, such as 100–150% molar excess, appeared to have no advantage.

The reactants are combined at room temperature and, after the reaction is well initiated, the reaction mixture is heated to above about 35° C., preferably in the range of about 45–60° C., to complete the sulfonation with a minimum of discoloration and by-product formation. After a total of about two hours heating the reaction mixture is only a light amber color, the solvents are removed by distillation under vacuum, and the 2-sulfo derivative is readily separated and purified as the disodium salt.

The amount of dioxane added is preferably a molar ratio at least equal to that of the sulfur trioxide. In practice a small excess, 5–10%, of dioxane was used to insure favorable reaction conditions.

The sulfonated derivative may be obtained as the free acid, as a mono-alkali salt of sodium, potassium or ammonium, or the di-alkali salt of sodium, potassium, or ammonium. The addition of an alkali such as sodium hydroxide, potassium hydroxide or ammonium hydroxide, is considered to neutralize the $SO_3H$ group first, and at a certain pH, such as about 4.5, or by adding a calculated amount of alkali, a compound of the formula $$RC(R')(SO_3M)COOH$$

where M is sodium, potassium or ammonium, is obtained and R and R' are previously described. Complete neutralization gives a compound of the formula $$RC(R')(SO_3M)COOM'$$

where M and M' are sodium, potassium or ammonium or mixtures thereof. The 2-sulfo-2-alkyl carboxylic acids are also converted to alkyl esters of the formula $$RC(R')(SO_3M)COOR''$$

where R'' is preferably a short carbon chain alkyl group such as 1 to 6 carbon atoms by refluxing with a selected alcohol employing azeotropic removal of water.

In order to provide conditions conducive to obtaining optimum yields of product, the solvents and reagents for The center cut of the dioxane distillate was separated, passed through a 12-inch column of silica gel and stored over anhydrous sodium sulfate. The sulfur trioxide was freshly distilled prior to use.

Example 7

Dry carbon tetrachloride, 240 ml., and 16 g. (0.184 mole) dry dioxane were combined in a round bottom flask equipped with a bar magnet, condenser and drying tube. The mixture was stirred while cooling to 15° C. and 11.1 g. (0.14 mole) of freshly distilled sulfur trioxide in 30 ml. of carbon tetrachloride was added, forming a white, crystalline slurry. After stirring the sulfur trioxide-dioxane slurry for 10 minutes, 30 g. (0.092 mole) of 2-methyleicosanoic acid (purified product of Example 1) in 30 ml. of carbon tetrachloride was added. The mixture was stirred at room temperature for 15 minutes, 45° C. for 45 minutes and 60° C. for an additional hour. The reaction mixture was filtered to remove insolubles and volatiles were evaporated from the filtrate under vacuum. The residue was dissolved in 250 ml. absolute ethanol and neutralized with a slight excess of 6 N sodium hydroxide. The product, disodium 2-sulfo-2-methyleicosanoate, precipitated, was collected in a filter funnel, and recrystallized twice from ethanol-water mixture.

Examples 8–11

In a manner similar to that described in Example 7, disodium 2-sulfo-2-alkyl carboxylates were prepared from the 2-alkyl carboxylic acids of Examples 2 to 5.

Analytical data for the compounds of Examples 7 to 11 is presented in Table II.

The disodium salts were readily separated and purified; hence, are a conveniently prepared derivative and at the same time a practical derivative for use as a surface active agent. Attempts to sulfonate 2,2-dimethylhexadecanoic acid resulted in the formation of a complex mixture of products.

Monosodium salts (soaps) of the compounds of Examples 1 to 6 were prepared by neutralizing the acids with sodium hydroxide and recovering the salts. Pertinent surface active properties of these sodium salts and of the disodium salts of the 2-sulfonated derivatives (Examples 7–11) were determined and are summarized in Table III.

TABLE II.—ANALYSIS OF DISODIUM 2-SULFO-2-ALKYL CARBOXYLATES RR'C(CO₂NA)SO₃Na

| Example Number | Compound | Substituents | | Analysis | | | | | | | |
|---|---|---|---|---|---|---|---|---|---|---|---|
| | | R | R' | Found | | | | Theory | | | |
| | | | | C | H | S | Na | C | H | S | Na |
| 7 | Disodium 2-sulfo-2-methyleicosanoate | $CH_3$ | $C_{18}H_{37}$ | 55.74 | 9.22 | 6.53 | 9.89 | 56.00 | 8.90 | 7.12 | 10.02 |
| 8 | 2-methyloctadecanoate | $CH_3$ | $C_{16}H_{33}$ | | | | | 54.03 | 8.53 | 7.58 | 10.90 |
| 9 | 2-butyltetradecanoate | $C_4H_9$ | $C_{12}H_{25}$ | 53.40 | 8.40 | 8.30 | 11.28 | 52.94 | 8.33 | 7.84 | 11.27 |
| 10 | 2-heptylundecanoate | $C_7H_{15}$ | $C_9H_{19}$ | 52.68 | 8.28 | 7.57 | 11.40 | 52.94 | 8.33 | 7.84 | 11.27 |
| 11 | 2-octyldecanoate | $C_8H_{17}$ | $C_8H_{17}$ | 52.12 | 8.26 | 8.68 | 11.58 | 52.94 | 8.33 | 7.84 | 11.27 |

TABLE III.—SOME SURFACE ACTIVE PROPERTIES OF SODIUM SALTS OF 2-ALKYL CARBOXYLIC ACIDS AND 2-SULFONATED DERIVATIVES

| Salt | Krafft Point,[a] °C. | Surface Tension,[b] Dynes/cm. | Micelle Conc.,[c] 25° C., Percent | Wetting Time,[d] Sec. | Detergency[e] Reflectance | Foam Height,[f] mm. |
|---|---|---|---|---|---|---|
| Monosodium | | | | | | |
| Octadecanoate (sodium stearate) | 67.5 | ---------- | 0.015 | >300 | 35 | 238 |
| 2-methyleicosanoate | 55.8 | 35.1 | 0.18 | >300 | 30 | 149 |
| 2-methyloctadecanoate | 40.5 | 26.1 | 0.29 | >300 | 29 | 217 |
| 2-butyltetradecanoate | <1 | 28.9 | 0.07 | 48 | 21 | 210/130 |
| 2-heptylundecanoate | 12 | 31.6 | 0.15 | >300 | 20 | 210/15 |
| 2-octyldecanoate | 17 | 31.6 | 0.13 | 100 | 18 | 230/45 |
| 2,2-dimethylhexadecanoate | 39 | 26.0 | 0.04 | 86 | 25 | 215 |
| Disodium | | | | | | |
| 2-sulfoactadecanoate | 92 | ---------- | 0.10 | ---------- | 20 | ---------- |
| 2-sulfo-2-methyleicosanoate | 53 | 41.4 | 0.01 | >300 | 22 | 193 |
| 2-sulfo-2-methyloctadecanoate | 43.5 | 33.8 | 0.04 | 49 | 22 | 200 |
| 2-sulfo-2-butyltetrodecanoate | 32.5 | 36.7 | 0.28 | 7.4 | 8 | 85/5 |
| 2-sulfo-2-heptylundecanoate | 55.5 | 34.8 | 0.37 | 4.8 | 8 | 0 |
| 2-sulfo-2-octyldecanoate | 67 | 35.5 | ---------- | 5.0 | 8 | 0 |

[a] Temperature at which a 1% dispersion becomes a clear solution on gradual heating.
[b] 0.1% concentration, 25° C. with DuNouy tensiometer.
[c] Critical micelle concentration determined by pinacyanole method.
[d] 0.1% solutions in distilled water at 25° C. with a 5 g. cotton skein and a 3 g. hook.
[e] Increase in reflectance after washing G.D.C. #26 standard soiled cotton in 0.25% solutions in distilled water at 60° C.
[f] 0.25% solutions in distilled water by the Ross-Miles test at 60° C. The ratios indicate foam degeneration after 5 minutes.

The Krafft point is indicative of solubility of the compound in water, the lower the value the greater the solubility. Comparing several monosodium salts with a total of eighteen carbon atoms, the branched chain soaps such as 2-butyltetradecanoate, 2-heptylun-decanoate, and 2-octyldecanoate have Krafft points of <1, 12 and 17° C., respectively, as compared to 67.5° C. for sodium stearate. These soaps have fairly good detergency and good initial foaming properties in soft water, so their solubility makes them particularly suitable for use in liquid detergents.

The disodium salts of the 2-sulfonated derivatives of 2-alkyl carboxylic acids are also more soluble in soft water than corresponding straight carbon chain compounds.

The foregoing is presented to illustrate the invention and is not intended to be in limitation thereof.

We claim:
1. A compound of the formula

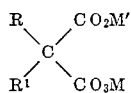

wherein R is a straight carbon chain alkyl having 7 to 16 carbon atoms, R' is a straight carbon chain alkyl having 1 to 10 carbon atoms and the sum of carbon atoms of $R+R'$ is an integer from 10 to 20, M is selected from the group consisting of hydrogen, sodium, potassium, and ammonium; and M' is selected from the group consisting of hydrogen, sodium, potassium, ammonium and an alkyl having 1 to 6 carbon atoms.

2. A compound of the formula of claim 1 wherein M and M' are hydrogen.
3. 2-sulfo-2-methyleicosanoic acid.
4. 2-sulfo-2-methyloctadecanoic acid.
5. 2-sulfo-2-butyltetradecanoic acid.
6. 2-sulfo-2-heptylundecanoic acid.
7. 2-sulfo-2-octyldecanoic acid.
8. A compound of the formula of claim 1 wherein M and M' are sodium.
9. Disodium 2-sulfo-2-methyleicosanoate.
10. Disodium 2-sulfo-2-methyloctadecanoate.
11. Disodium 2-sulfo-2-butyltetradecanoate.
12. Disodium 2-sulfo-2-heptylundecanoate.
13. Disodium 2-sulfo-2-octyldecanoate.

14. A process for preparing 2-sulfo-2-alkylcarboxylic acids of the formula

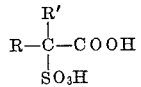

wherein R is a straight carbon chain alkyl having 7 to 16 carbon atoms, R' is a straight carbon chain alkyl having 1 to 10 carbon atoms, and the sum of the carbon atoms of $R+R'$ is an integer from 10 to 20, said process comprising mixing a 2-alkylcarboxylic acid of the formula

wherein R and R' have the same meaning as above, with at least about a 50% molar excess of $SO_3$ and dioxane in an inert solvent at room temperature, and heating the mixture to a temperature of about 35 to 60° C. to produce the 2-sulfo-2-alkylcarboxylic acid.

15. The process of claim 14 wherein the 2-alkylcarboxylic acid is 2-methyleicosanoic acid and the product is 2-sulfo-2-methyleicosanoic acid.

16. The process of claim 14 wherein the 2-alkylcarboxylic acid is 2-methyloctadecanoic acid and the product is 2-sulfo-2-methyloctadecanoic acid.

17. The process of claim 14 wherein the 2-alkylcarboxylic acid is 2-butyltetradecanoic acid and the product is 2-sulfo-2-butyltetradecanoic acid.

18. The process of claim 14 wherein the 2-alkylcarboxylic acid is 2-heptylundecanoic acid and the product is 2-sulfo-2-heptylundecanoic acid.

19. The process of claim 14 wherein the 2-alkylcarboxylic acid is 2-octyldecanoic acid and the product is 2-sulfo-2-octyldecanoic acid.

References Cited

UNITED STATES PATENTS 2,135,358   11/1938   Suter _____ 260—400 X

OTHER REFERENCES

Petrov et al., Chemical abstract, vol. 54, col. 16381 (1960).

Woodbridge, the Journal of the American Oil Chemists' Society, vol. 35, p. 531 (1958).

NICHOLAS S. RIZZO, *Primary Examiner.*

J. H. TURNIPSEED, *Assistant Examiner.*